United States Patent
Abe

(10) Patent No.: US 11,887,327 B2
(45) Date of Patent: Jan. 30, 2024

(54) MICROSCOPIC EXAMINATION DEVICE AND NAVIGATION METHOD

(71) Applicant: EVIDENT CORPORATION, Nagano (JP)

(72) Inventor: Yoko Abe, Tokyo (JP)

(73) Assignee: Evident Corporation, Nagano (JP)

( * ) Notice: Subject to any disclaimer, the term of this patent is extended or adjusted under 35 U.S.C. 154(b) by 80 days.

(21) Appl. No.: 17/833,965

(22) Filed: Jun. 7, 2022

(65) Prior Publication Data

US 2022/0309701 A1   Sep. 29, 2022

Related U.S. Application Data

(63) Continuation of application No. PCT/JP2019/049050, filed on Dec. 13, 2019.

(51) Int. Cl.
*G06T 7/70* (2017.01)
*G06T 7/30* (2017.01)
(Continued)

(52) U.S. Cl.
CPC ............ *G06T 7/70* (2017.01); *G02B 21/0036* (2013.01); *G06T 7/001* (2013.01); *G06T 7/20* (2013.01);
(Continued)

(58) Field of Classification Search
CPC . G06T 2207/10056; G06T 2207/30108; G06T 2207/30164; G06T 7/30;
(Continued)

(56) References Cited

U.S. PATENT DOCUMENTS

| | | |
|---|---|---|
| 6,362,877 B1 | 3/2002 | Kobayashi et al. |
| 2003/0210262 A1 | 11/2003 | Gahm et al. |

(Continued)

FOREIGN PATENT DOCUMENTS

| | | |
|---|---|---|
| EP | 2194414 A2 | 6/2010 |
| JP | H10197221 A | 7/1998 |

(Continued)

OTHER PUBLICATIONS

Wang, Ruohui, "Edge Detection Using Convolutional Neural Network", Advances in Neural Network—ISNN 2016, 13th International Symposium on Neural Network (2016), Springer International Publishing, Switzerland, pp. 12-20, cited in spec on p. 14.

(Continued)

*Primary Examiner* — Sherrie Hsia

(74) *Attorney, Agent, or Firm* — Scully, Scott, Murphy & Presser, P.C.

(57) ABSTRACT

A microscopic examination device includes: a camera that images an observation area of an examination subject observed with a microscope device so as to acquire an image of the observation area; and one or more processors including hardware, the one or more processors being configured to: align the image of the observation area with an area in a reference image, the area corresponding to the image of the observation area; generate a navigation map from the reference image by recording, on the reference image, a position of the image of the observation area in the reference image; calculate a direction of movement to an unobserved area in the navigation map, the unobserved area being an area where the position of the image of the observation area
(Continued)

is not recorded; and present an access method to the unobserved area on a basis of the direction of movement.

8 Claims, 17 Drawing Sheets

(51) Int. Cl.
  *G06T 7/00*     (2017.01)
  *G06T 7/20*     (2017.01)
  *G02B 21/00*    (2006.01)
  *G02B 21/36*    (2006.01)
  *G02B 21/26*    (2006.01)
(52) U.S. Cl.
  CPC ...... *G06T 7/30* (2017.01); *G06T 2207/10056* (2013.01); *G06T 2207/30108* (2013.01)
(58) Field of Classification Search
  CPC .. G06T 7/001; G06T 7/20; G06T 7/70; G02B 21/365; G02B 21/367; G02B 21/26; G02B 21/28; G02B 21/0036
  USPC .................................................... 348/79, 80
  See application file for complete search history.

(56) References Cited

U.S. PATENT DOCUMENTS

| | | | |
|---|---|---|---|
| 2008/0055405 A1* | 3/2008 | Maddison | G02B 21/365 348/79 |
| 2009/0006969 A1 | 1/2009 | Gahm et al. | |
| 2010/0171809 A1 | 7/2010 | Fujiyoshi | |

FOREIGN PATENT DOCUMENTS

| | | |
|---|---|---|
| JP | 2001091854 A | 4/2001 |
| JP | 2002350123 A | 12/2002 |
| JP | 2005530225 A | 10/2005 |
| JP | 2008082740 A | 4/2008 |
| JP | 2010134374 A | 6/2010 |
| JP | 2015082099 A | 4/2015 |
| JP | 2019191306 A | 10/2019 |
| WO | 1994024518 A1 | 10/1994 |
| WO | 2003096228 A1 | 11/2003 |

OTHER PUBLICATIONS

International Search Report dated Mar. 10, 2020 issued in PCT/JP2019/049050.

* cited by examiner

MICROSCOPIC EXAMINATION DEVICE AND NAVIGATION METHOD

CROSS-REFERENCE TO RELATED APPLICATIONS

This is a continuation of International Application PCT/JP2019/049050, with an international filing date of Dec. 13, 2019, which is hereby incorporated by reference herein in its entirety.

TECHNICAL FIELD

The present invention relates to a microscopic examination device and a navigation method.

BACKGROUND ART

In processes for manufacturing industrial products such as electronic parts, automobiles, and medical devices, abnormalities such as scratches, defects, impurities, and contaminants are examined visually. As technical innovation accelerates and customer needs shift ever faster, the lifecycle of products has shortened, and the demand for high-variety, small-lot production has grown. Visual examination conducted with a microscope manually operated by a highly skilled engineer having high sensing performance is advantageous compared to automated optical examination devices from the viewpoints of cost, flexibility, quality assurance, etc.

In visual examination, the operator manually moves the examination subject or the stage of a microscope to move the observation area of the examination subject and to thereby observe all parts of the examination subject. Typically, the operator moves the observation area by using a specific site within the examination subject as a marker to confirm the approximate position of the observation area. However, when the observation area is manually moved, it is difficult to unfailingly observe all parts of the examination subject. Upon identifying the presence of an unobserved area, the operator switches the objective lens from a high-magnification lens to a low-magnification lens, confirms the position of the unobserved area in a wide visual field, moves the unobserved area to the center of the visual field, switches the objective lens back to the high-magnification lens, and observes the unobserved area. As such, visual examination that involves manually moving the observation subject takes effort and time. Moreover, since the observation area is very narrow, the operator may lose track of the positions of already observed areas and the positions of unobserved areas, and may have difficulty determining whether or not all parts of the examination subject have been observed.

Meanwhile, there is a known microscope system for multiwell plate observation, in which a current visual field range of the microscope is overlaid on a navigation image that includes one entire well (for example, see PTL 1). The operator can keep the track of the current observation position on the basis of the position of the visual field range on the navigation image.

CITATION LIST

Patent Literature

{PTL 1}
Japanese Unexamined Patent Application, Publication No. 2015-82099

SUMMARY OF INVENTION

An aspect of the present invention is directed to a microscopic examination device comprising: a camera that images an observation area of an examination subject observed with a microscope device so as to acquire an image of the observation area; and one or more processors comprising hardware, the one or more processors being configured to: align the image of the observation area with an area in a reference image, the area corresponding to the image of the observation area, the reference image including an entirety of the examination subject; generate a navigation map from the reference image by recording, on the reference image, a position of the image of the observation area in the reference image; calculate a direction of movement to an unobserved area in the navigation map, the unobserved area being an area where the position of the image of the observation area is not recorded; and present an access method to the unobserved area on a basis of the direction of movement.

Another aspect of the present invention is directed to a navigation method for guiding an observation area of an examination subject to be observed with a microscope device, the navigation method including: imaging the observation area to acquire an image of the observation area; aligning the image of the observation area with an area in a reference image, the area corresponding to the image of the observation area, the reference image including an entirety of the examination subject; generating a navigation map from the reference image by recording, on the reference image, a position of the image of the observation area in the reference image; calculating a direction of movement to an unobserved area in the navigation map, the unobserved area being an area where the position of the image of the observation area is not recorded; and presenting an access method to the unobserved area on the basis of the direction of movement.

DESCRIPTION OF EMBODIMENTS

First Embodiment

A microscopic examination device 1 according to a first embodiment of the present invention will now be described with reference to the drawings.

Figure 1:
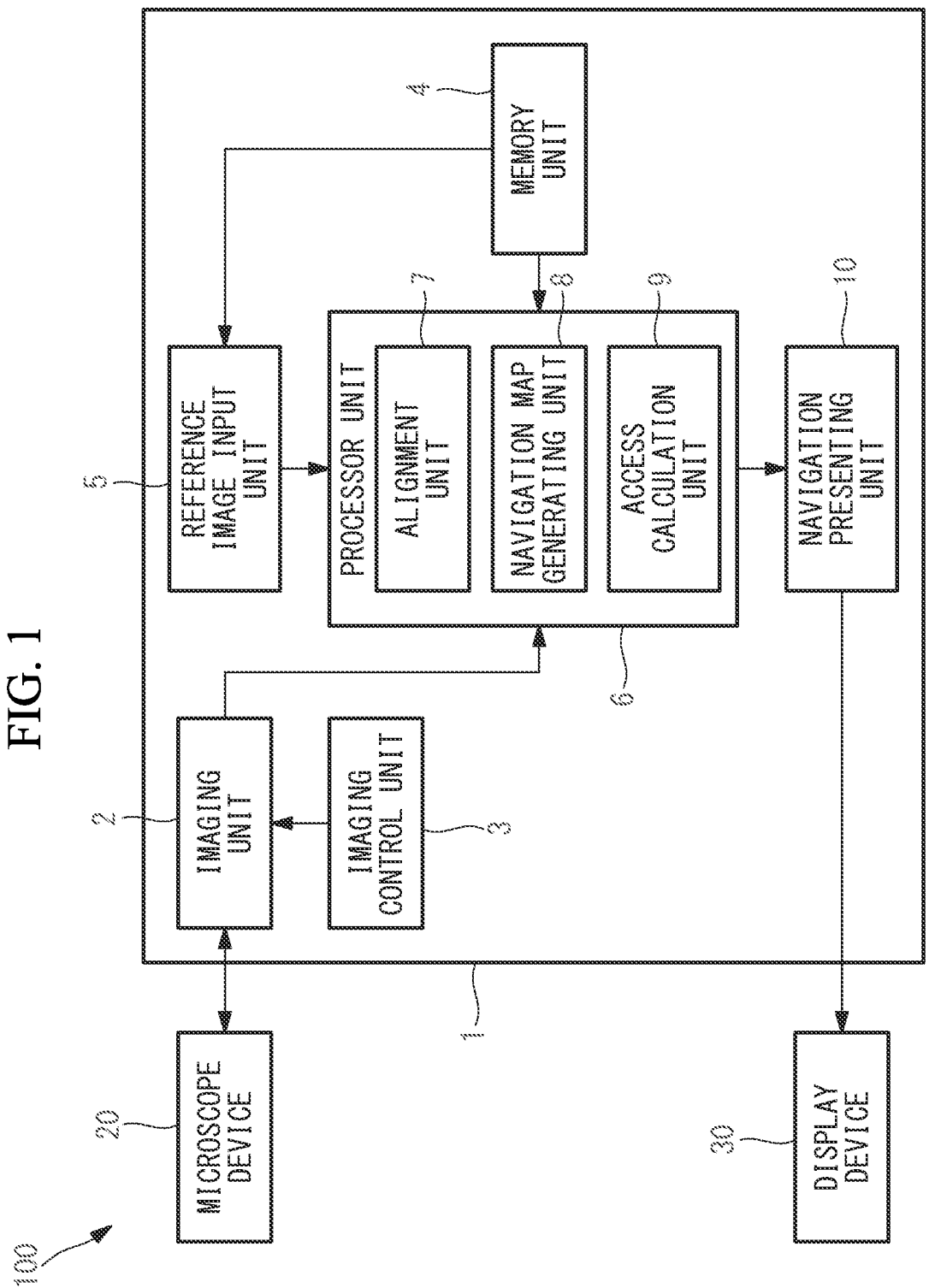
FIG. 1 is a diagram of the overall structure of a microscopic examination device and a microscopic examination system according to a first embodiment of the present invention.

FIG. 1 is a diagram illustrating the overall structure of a microscopic examination system 100 that includes a microscopic examination device 1. The microscopic examination system 100 also includes a microscope device 20 and a display device 30, and the microscopic examination device 1 is connected to the microscope device 20 and the display device 30.

The microscope device 20 is an optical microscope device of a type in which the operator manually moves the observation area of an examination subject S to be observed through an objective lens, and is used in visual examination of the examination subject S. The examination subject S is, for example, an electronic component such as a circuit board, or a component part of an industrial product such as an automobile, an airplane, or medical equipment. The microscopic examination device 1 generates a navigation map (see FIGS. 3B to 4B) for guiding the observation area to an unobserved area of the examination subject S in the visual examination using the microscope device 20, and displays the navigation map on the display device 30.

Figure 2:
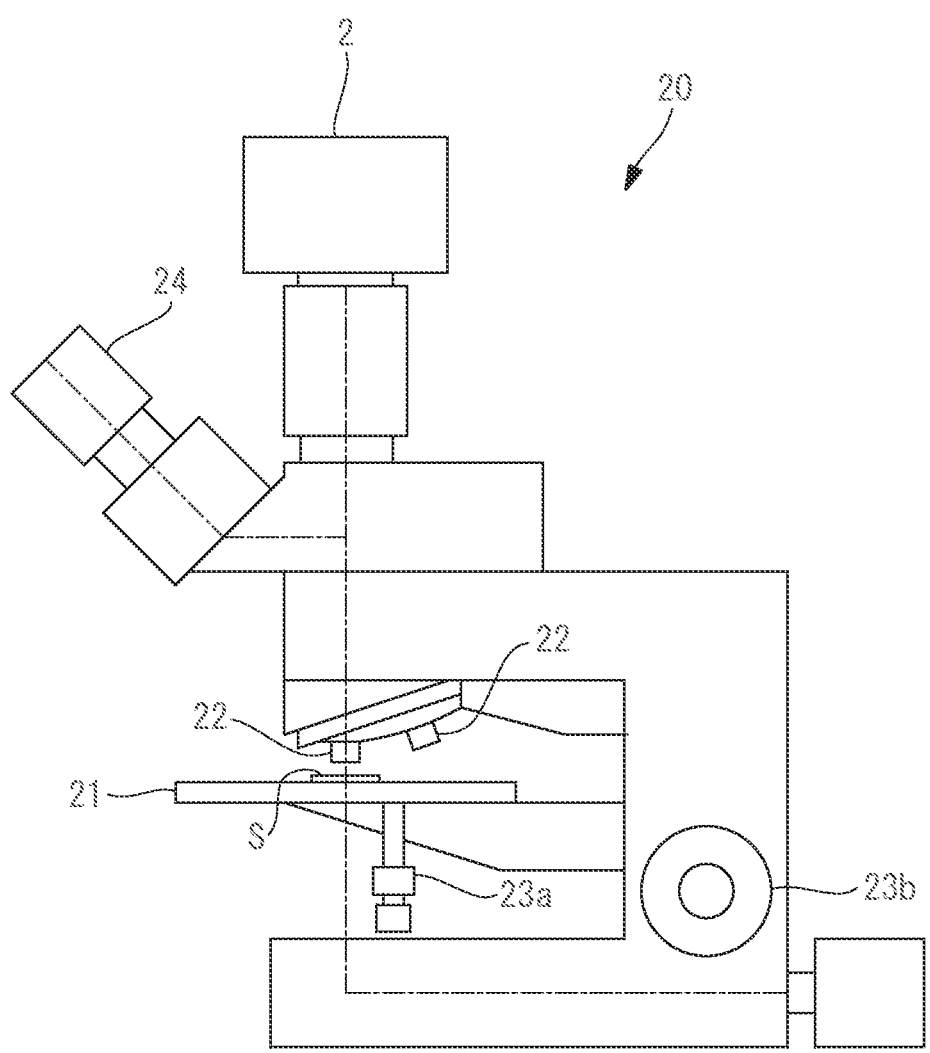
FIG. 2 FIG. 2 is a diagram illustrating one example of a microscope device illustrated in FIG. 1.

FIG. 2 illustrates one example of the microscope device 20. The microscope device 20 illustrated in FIG. 2 is equipped with a stage 21 on which the examination subject S is placed, an objective lens 22 for observing the examination subject S on the stage 21, handles 23a and 23b used by the operator to manually maneuver the stage 21, and an ocular lens 24. The handle 23a is used to move the stage 21 in the X direction and the Y direction orthogonal to the optical axis of the objective lens 22, and the handle 23b is used to move the stage 21 in the Z direction that runs along the optical axis of the objective lens 22. Through the ocular lens 24, the operator can observe an optical image of the observation area of the examination subject S formed by the objective lens 22.

The microscope device 20 may be a stereoscopic microscope device, in which the examination subject S is held with the hands of the operator and moved.

The display device 30 is a display device of any type, such as a liquid crystal display, placed outside the microscope device 20. Alternatively, the display device 30 may be a display placed within the visual field of the ocular lens 24, or a display connected to the microscope device 20 and designed to project an image onto the visual field of the ocular lens 24.

The digital image of the visual field of the ocular lens 24 may be displayed on the display device 30 outside the microscope device 20. In such a case, the operator may observe the digital image displayed on the display device 30 instead of observing the optical image of the examination subject S through the ocular lens 24. The display device 30 may display the digital image and the navigation map side-by-side so that the operator can easily compare the digital image and the navigation map.

As illustrated in FIG. 1, the microscopic examination device 1 includes an imaging unit 2, an imaging control unit 3, a memory unit 4, a reference image input unit 5, a processor unit 6 that includes an alignment unit 7, a navigation map generating unit 8, and an access calculation unit 9, and a navigation presenting unit 10.

The imaging unit 2 is a digital camera equipped with an imaging element and a memory, and is connected to a camera port of the microscope device 20. The imaging unit 2 captures an optical image of the observation area of the examination subject S formed by the objective lens 22, and acquires an observation image, which is a digital image of the observation area. The observation image is input from the imaging unit 2 to the processor unit 6.

On the basis of the movement of the observation area and the imaging conditions, the imaging control unit 3 commands the imaging unit 2 to acquire a live image or a still image, which is an observation image. For example, on the basis of the live image acquired through the imaging unit 2, the imaging control unit 3 detects whether the observation area is moving or not, and commands the imaging unit 2 to acquire a still image under imaging conditions preset by the operator at a timing when the observation area has stopped moving. Alternatively, the imaging control unit 3 may command the imaging unit 2, which is capturing live images, to acquire still images at particular time intervals. Acquisition of a still image at a timing when the observation area has stopped moving and acquisition of still images at particular time intervals may both be performed. Alternatively, in order to prevent acquisition of multiple still images of the same visual field and to efficiently acquire still images, the imaging control unit 3 may detect switching of the visual field on the basis of the live image and may command acquisition of a still image upon switching of the visual field.

The memory unit 4 has a reference image of the examination subject S and a program preliminarily stored therein.

The reference image is an image that includes the entirety of the examination subject S. For example, the reference image is a design drawing of the examination subject S, and the memory unit 4 stores the CAD data of the design drawing.

The program is a microscopic examination program that allows a processor to execute the processes that involve the imaging control unit 3, the reference image input unit 5, the processor unit 6, and the navigation presenting unit 10. In other words, the functions of the imaging control unit 3, the reference image input unit 5, the processor unit 6, and the navigation presenting unit 10 described below are realized by the processor.

The reference image input unit 5 acquires the reference image of the examination subject S from the memory unit 4, and inputs the reference image to the processor unit 6. The reference image input unit 5 may acquire the reference image by a different method. For example, the reference image input unit 5 may acquire a reference image, which has been obtained by any imaging device before starting the examination, from a device outside the microscopic examination device 1.

The processor unit 6 generates a navigation map by using the observation image from the imaging unit 2 and the reference image from the reference image input unit 5, and calculates the information needed to reach the unobserved area on the basis of the navigation map.

The alignment unit 7 aligns the observation image with an area in the reference image that corresponds to the observation image. An existing technology is employed for alignment.

For example, the alignment unit 7 receives the reference image from the reference image input unit 5. The alignment unit 7 also reads the observation image from the imaging unit 2, and generates, from the observation image, a design image that serves as an observation image for alignment. The design image is a diagram corresponding to the design drawing of the observation area of the observation image, and is generated from the observation image by using a learning model generated by mechanical learning. Next, the alignment unit 7 calculates the similarity between the design image and local areas of the reference image, and the area with the highest similarity in the reference image is aligned with the design image.

In one example, a preliminarily constructed learned network is used to generate the design image. For example, a pair including an observation image and a design image is learned by using an image generating technology such as pix2pix so as to construct a design image generation network that generates a design image from an observation image. By inputting the observation image to the design image generation network, a design image is obtained.

In general, the generalization ability and learning speed are expected to improve by eliminating the bias contained in the learning data. Thus, an observation image and a design image that have been subjected to preprocesses such as normalization, standardization, decorrelation, and whitening may be used in learning.

The operator may designate the examination subject S and allow learning so that a learned network is generated immediately before start of the examination.

An existing matching algorithm is used for aligning the design image with the reference image. For example, a kernel of a predetermined size (m pixels×n pixels) is moved and rotated relative to the observation image or the reference image to calculate the sum of absolute difference (SAD), which is the sum of the absolute differences of pixel values, and the observation image is aligned on the basis of the position where the SAD is the smallest. When the kernel needs to be expanded or contracted, the kernel size is adjusted on the basis of the size of the observation image obtained from the magnification of the optical system of the microscope device 20 and the actual dimension information of the design image.

Generation and alignment of the design image may be performed by other methods. For example, an edge image that serves as a design image may be generated from the observation image by performing edge detection on the observation image, and the edge image may be aligned with the reference image. A traditional filter process, deep-learning edge assumption (Ruohui Wang, Edge Detection Using Convolutional Neural Network, Advances in Neural Network—ISNN 2016, 13th International Symposium on Neural Network, pp. 12-20, 2016), or the like is used for the edge detection.

Figure 3A:
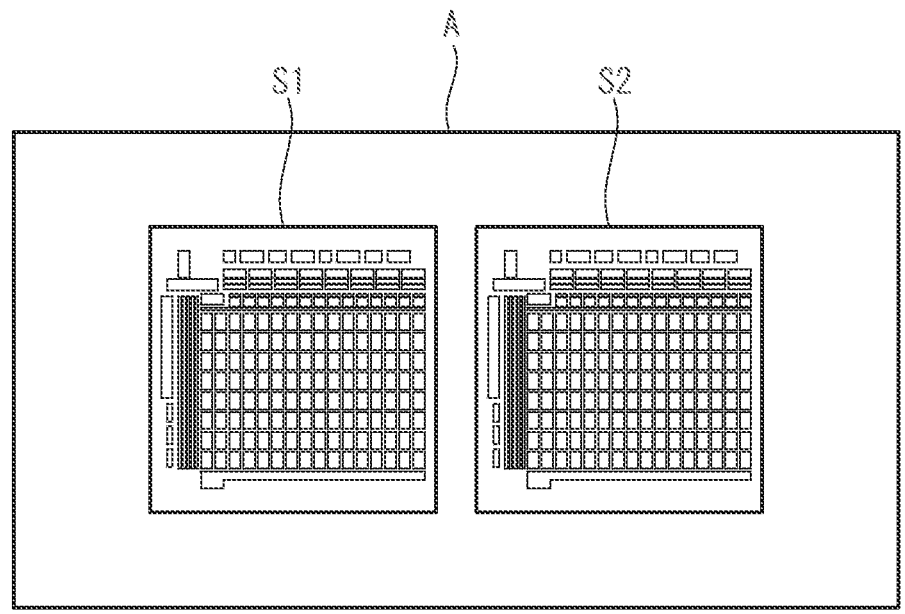
FIG. 3A illustrates an example of a reference image for a navigation map.

As illustrated in FIG. 3A, the navigation map generating unit 8 generates from the reference image a reference image A for navigation. For example, the reference image A for navigation is a copy of the reference image. Hereinafter, the reference image A for navigation is referred to as a copy reference image. In the example illustrated in FIG. 3A, the copy reference image A includes two areas S1 and S2 where electronic circuits are formed.

Next, on the basis of the alignment result of the design image relative to the reference image conducted by the alignment unit 7, the navigation map generating unit 8 records, on the copy reference image A, the position of the area that corresponds to the area in the reference image with which the design image has been aligned. Recording of the position is carried out by, for example, placing the design image in the area which is within the copy reference image A and which corresponds to the area in the reference image with which the design image has been aligned, and then registering the design image. The design image may be registered by blacking out the corresponding area.

Figure 3B:
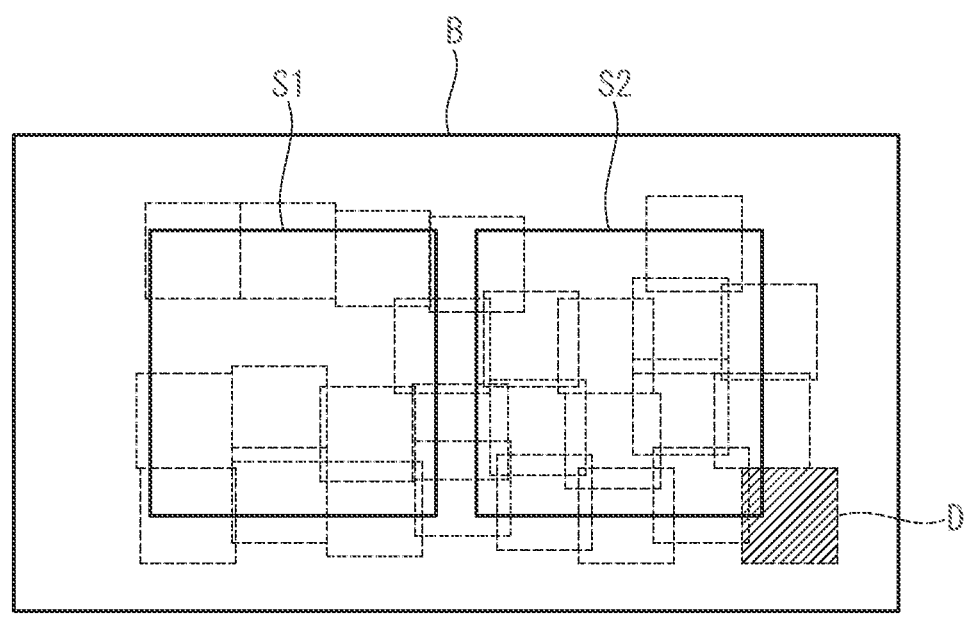
FIG. 3B is a diagram illustrating one example of a navigation map generated from the reference image illustrated in FIG. 3A.

The alignment unit 7 and the navigation map generating unit 8 repeat aligning of the design image and recording of the position on the copy reference image A until the alignment unit 7 and the navigation map generating unit 8 receive an examination completion notification. As a result, as illustrated in FIG. 3B, the navigation map generating unit 8 generates a navigation map B, on which the positions of the observation areas already observed by the operator are recorded, from the copy reference image A. In FIG. 3B, rectangles indicated by broken lines indicate areas where the positions of the observation images or the design images have been recorded, and a rectangle with hatching indicates an area D where the position of the observation image or the design image is recorded last. For the sake of simplicity of the drawing, illustration of detailed structures in the areas S1 and S2 is omitted from the drawings in FIG. 3B and onward. The examination completion notification is input to the processor unit 6 on the basis of the input by the operator to the microscopic examination device 1. For example, when the visual examination of the examination subject S is completed, the operator operates the operation unit installed in the microscopic examination device 1 to send the examination completion notification from the operation unit to the processor unit 6.

Upon receiving the examination completion notification, the navigation map generating unit 8 ends generation of the navigation map B. When there is an unobserved area that has not been observed by the operator within the examination subject S, the generated navigation map B includes the unobserved area where the position of the design image has not been recorded.

Figure 4A:
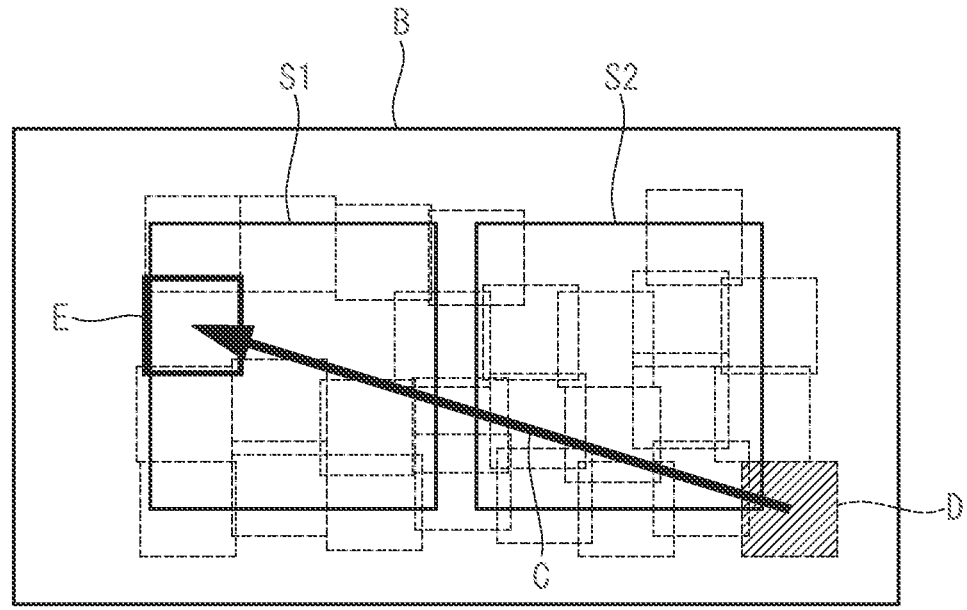
FIG. 4A is a diagram illustrating one example of the display of an access method to an unobserved area on the navigation map.

As illustrated in FIG. 4A, the access calculation unit 9 detects an unobserved area E from the navigation map B.

Since the observation area is manually moved by the operator, the size of the unobserved area varies. The access calculation unit 9 may detect, as one unobserved area E, an area having the same size as the observation area, which is the visual field of the objective lens 22. In FIG. 4A, only one of multiple unobserved areas present in the navigation map B is indicated by a solid-line rectangle.

Next, on the basis of the relative position in the navigation map B between the current observation area D and the unobserved area E, the access calculation unit 9 calculates the direction and the amount of movement from the current observation area D to the unobserved area E. For example, the access calculation unit 9 uses, as the current observation area D, an area of the design image last recorded on the navigation map B by the navigation map generating unit 8. The direction and amount of movement are calculated, for example, as a directional vector on the basis of the number of pixels between the center of the current observation area D and the center of the unobserved area E on the navigation map B.

Figure 4B:
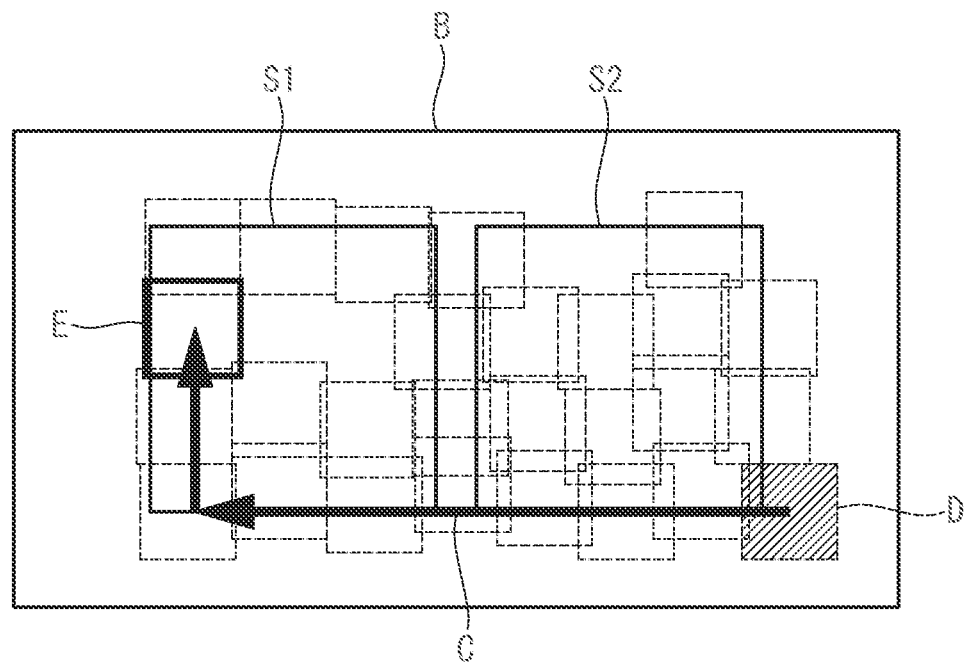
FIG. 4B is a diagram illustrating another example of the display of the access method to the unobserved area on the navigation map.

On the basis of the direction and amount of movement, for example, the directional vector, calculated by the access calculation unit 9, the navigation presenting unit 10 displays on the navigation map B an access method C to the unobserved area E so as to present the access method C to the operator. FIGS. 4A and 4B illustrate examples of how the access method C is displayed. In FIG. 4A, the display of the access method C involves an arrow that indicates the directional vector from the current observation area D to the unobserved area E. In other words, the tail of the arrow indicates the position of the current observation area D, and the head of the arrow indicates the position of the unobserved area E. In FIG. 4B, the display of the access method C involves two arrows that respectively indicate the X component and the Y component of the directional vector.

The display of the access method C may be an animation of the handle 23a that indicates the direction and amount of rotation of the handle 23a in the X direction and the Y direction of the stage 21.

The navigation map B on which the access method C is displayed is output from the navigation presenting unit 10 to the display device 30, and is displayed on the display device 30. The navigation map B that is being generated may be displayed on the display device 30, and the displayed navigation map B may be updated sequentially.

Next, a navigation method that guides the observation area of the examination subject S of the microscope device 20 to an area not yet observed is described with reference to FIGS. 5A to 5C. This navigation method involves an operation of the microscopic examination device 1.

The operator repeats observation of the observation area of the examination subject S through the ocular lens 24 and moving of the observation area so as to visually examine all parts of the examination subject S.

In parallel with the visual examination by the operator, the observation area is imaged and the navigation map B is generated by the microscopic examination device 1.

Figure 5A:
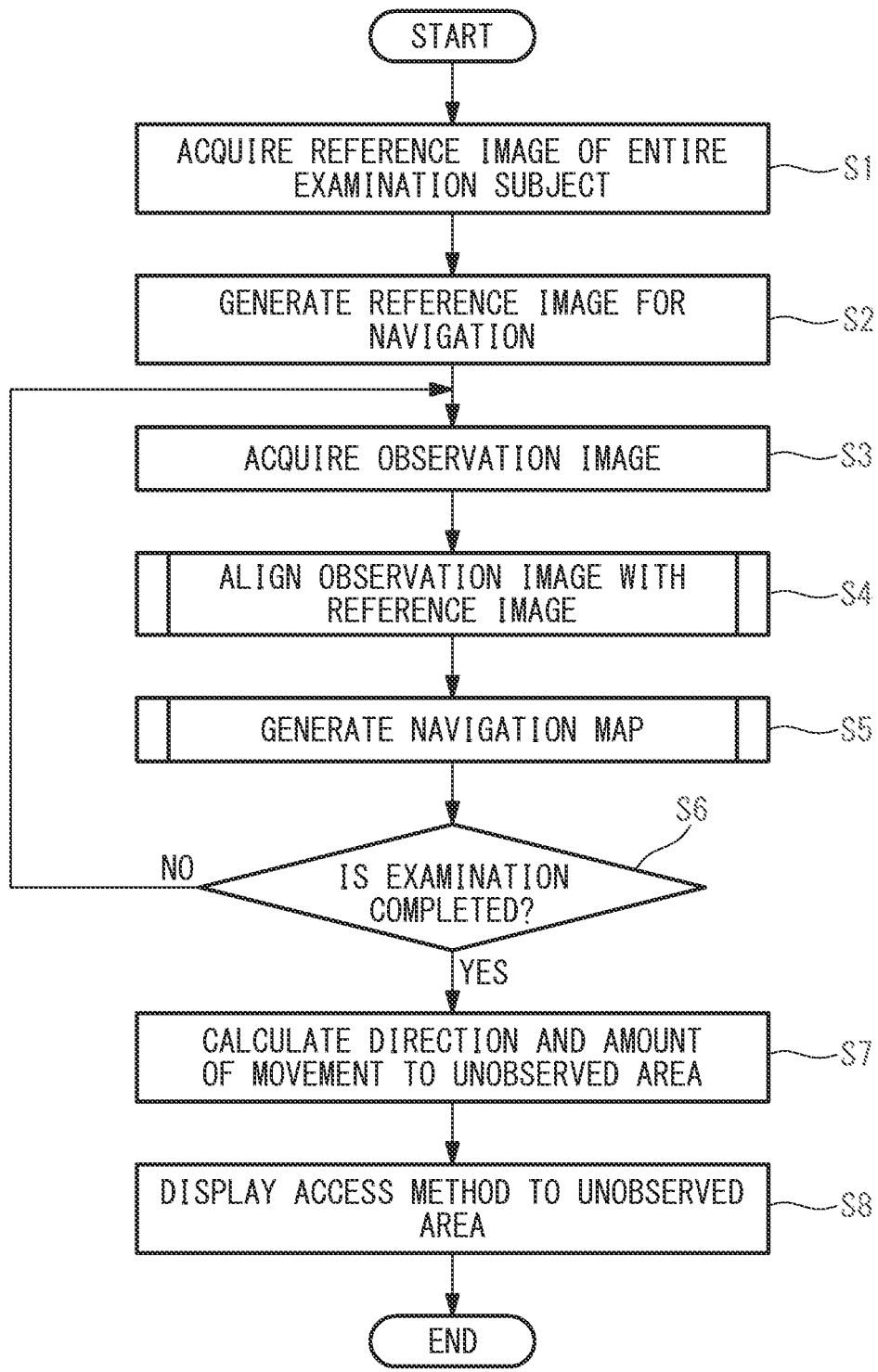
FIG. 5A is a flowchart illustrating the operation of the microscopic examination device illustrated in FIG. 1.
Figure 5B:
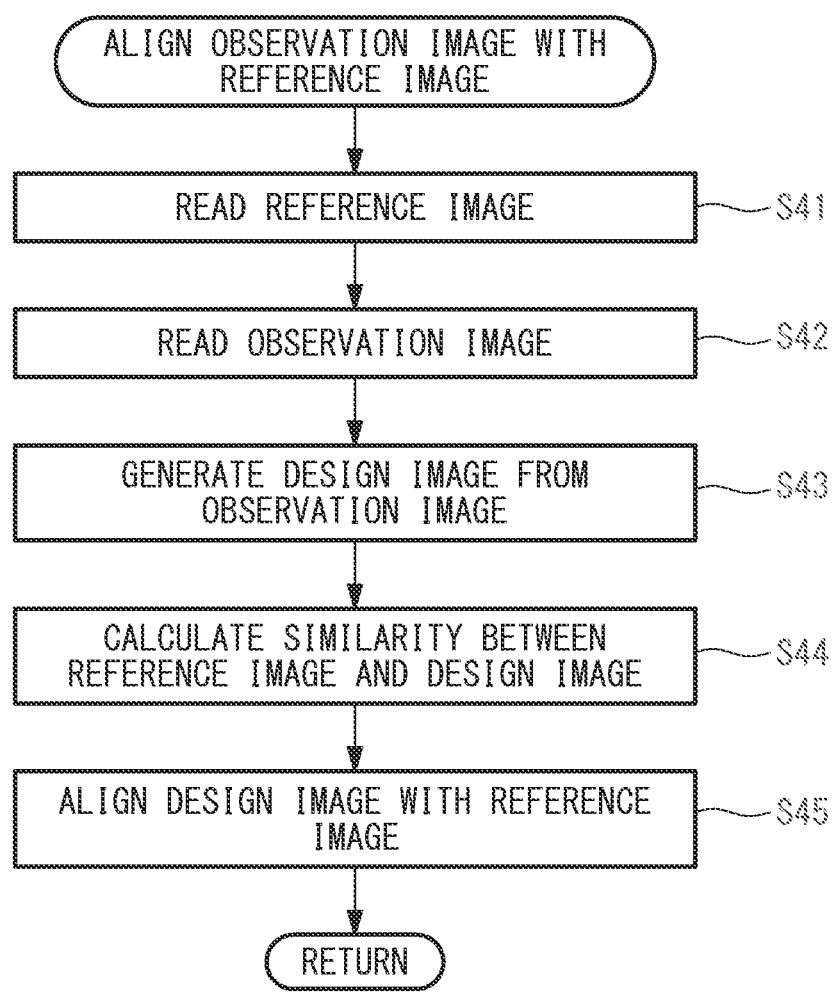
FIG. 5B is a flowchart illustrating a process of aligning an observation image with a reference image illustrated in FIG. 5A.
Figure 5C:
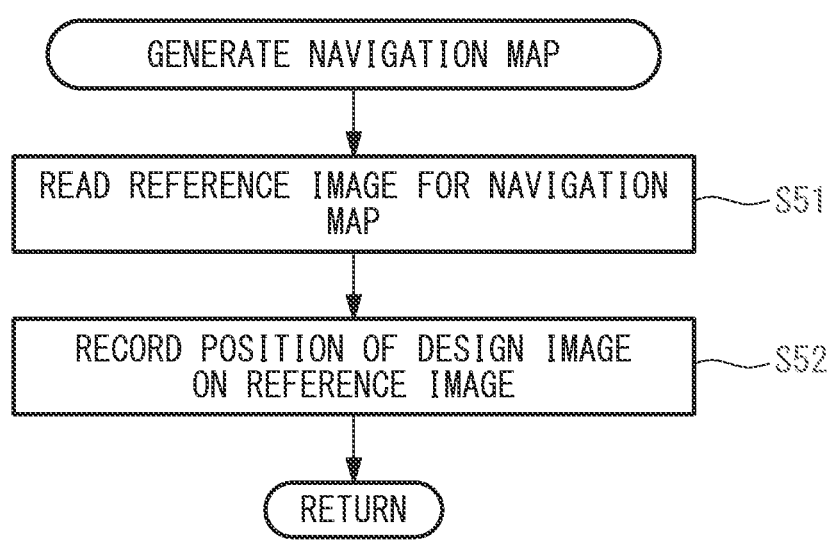
FIG. 5C is a flowchart illustrating a process of generating a navigation map illustrated in FIG. 5A.

Specifically, as illustrated in FIG. 5A, a reference image is acquired by the reference image input unit 5 (step S1), and a copy reference image A for generating a navigation map is generated from the reference image (step S2). An observation image, which is the image of the observation area that the operator is observing, is acquired by the imaging unit 2 (step S3).

The reference image is input from the reference image input unit 5 to the processor unit 6, and the observation image is input from the imaging unit 2 to the processor unit 6.

Next, the alignment unit 7 aligns the observation image with the corresponding area in the reference image (step S4). Specifically, as illustrated in FIG. 5B, the reference image and the observation image are read (steps S41 and S42), and a design image, which is an observation image for alignment, is generated from the observation image (step S43). Next, the similarity between the reference image and the design image is calculated (step S44), and the area having the highest similarity within the reference image is aligned with the design image (step S45).

Next, a navigation map B is generated by the navigation map generating unit 8 from the reference image (step S5). Specifically, as illustrated in FIG. 5C, a copy reference image A, which is a reference image for navigation, is generated from the reference image (step S51). Next, on the basis of the alignment result in step S4, the position of the design image is recorded on the copy reference image A (step S52).

The steps S3 to S5 are repeated until the visual examination of the examination subject S by the operator is completed, and as a result, positions of the design images are added to the copy reference image A and the navigation map B is generated.

After completion of the visual examination by the operator (YES in step S6), the access calculation unit 9 detects an unobserved area E in the navigation map B, and calculates the direction and amount of movement from the current observation area D to the unobserved area E (step S7). Next, the navigation presenting unit 10 displays, on the navigation map B, the access method C indicating the direction and amount of movement (step S8), and the navigation map B on which the access method C is displayed is displayed on the display device 30.

The operator can easily identify the already observed areas of the examination subject S through the navigation map B displayed on the display device 30. In addition, on the basis of the access method displayed on the navigation map B, the operator can easily recognize whether an unobserved area E is present and, if so, how to access the current observation area D to the unobserved area E. Particularly, by using, as a display of the access method C, a graphic indicating the direction and amount of movement to the unobserved area E, for example, an arrow or an animation of the handle 23a, the operator can more easily and intuitively recognize whether an unobserved area E is present and how to access the unobserved area E.

Figure 6:
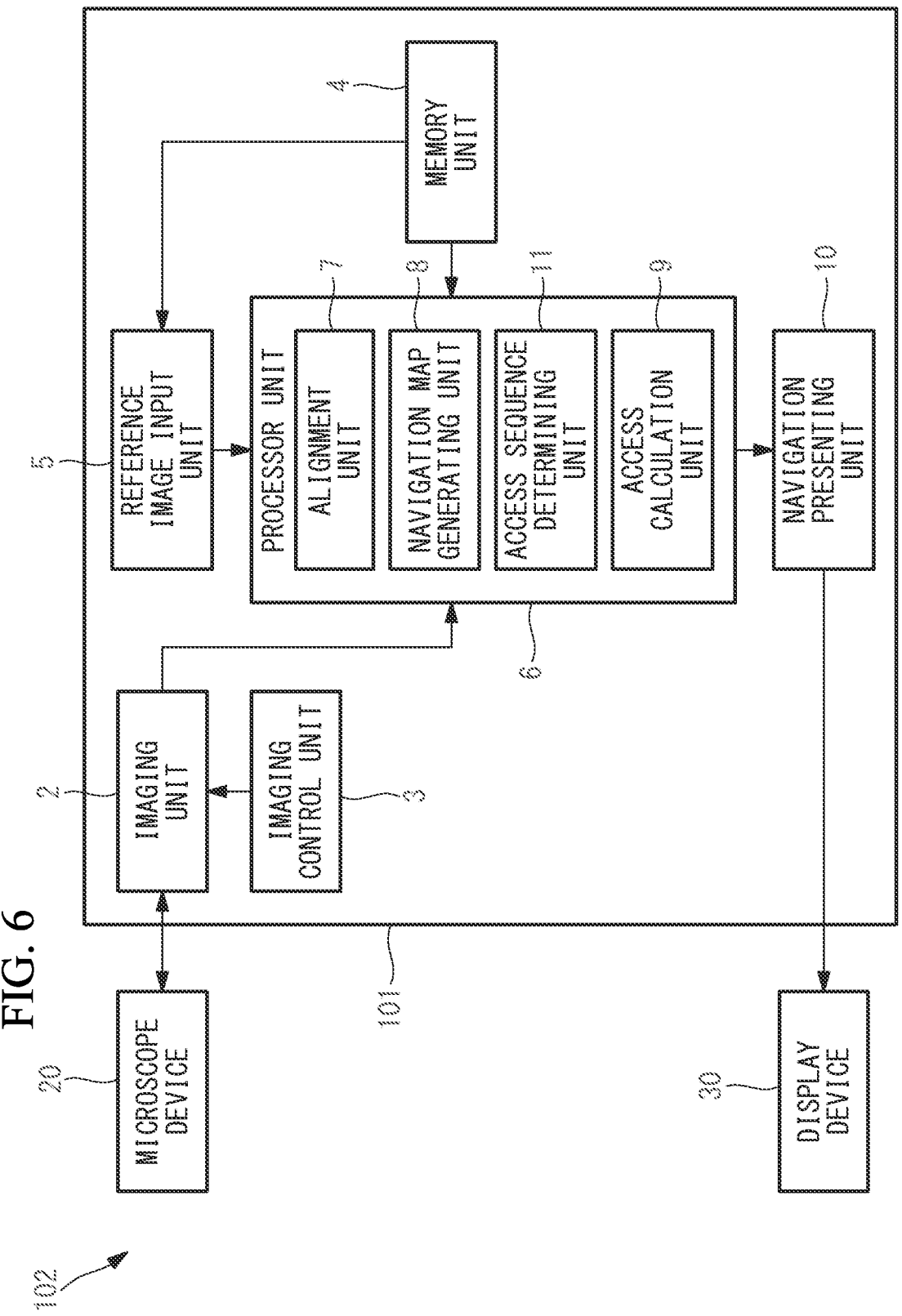
FIG. 6 is a diagram of the overall structure of a modification of the microscopic examination device and the microscopic examination system illustrated in FIG. 1.

FIG. 6 illustrates a modification of the present embodiment.

As illustrated in FIG. 6, a microscopic examination device 101 may further include an access sequence determining unit 11.

Figure 7A:
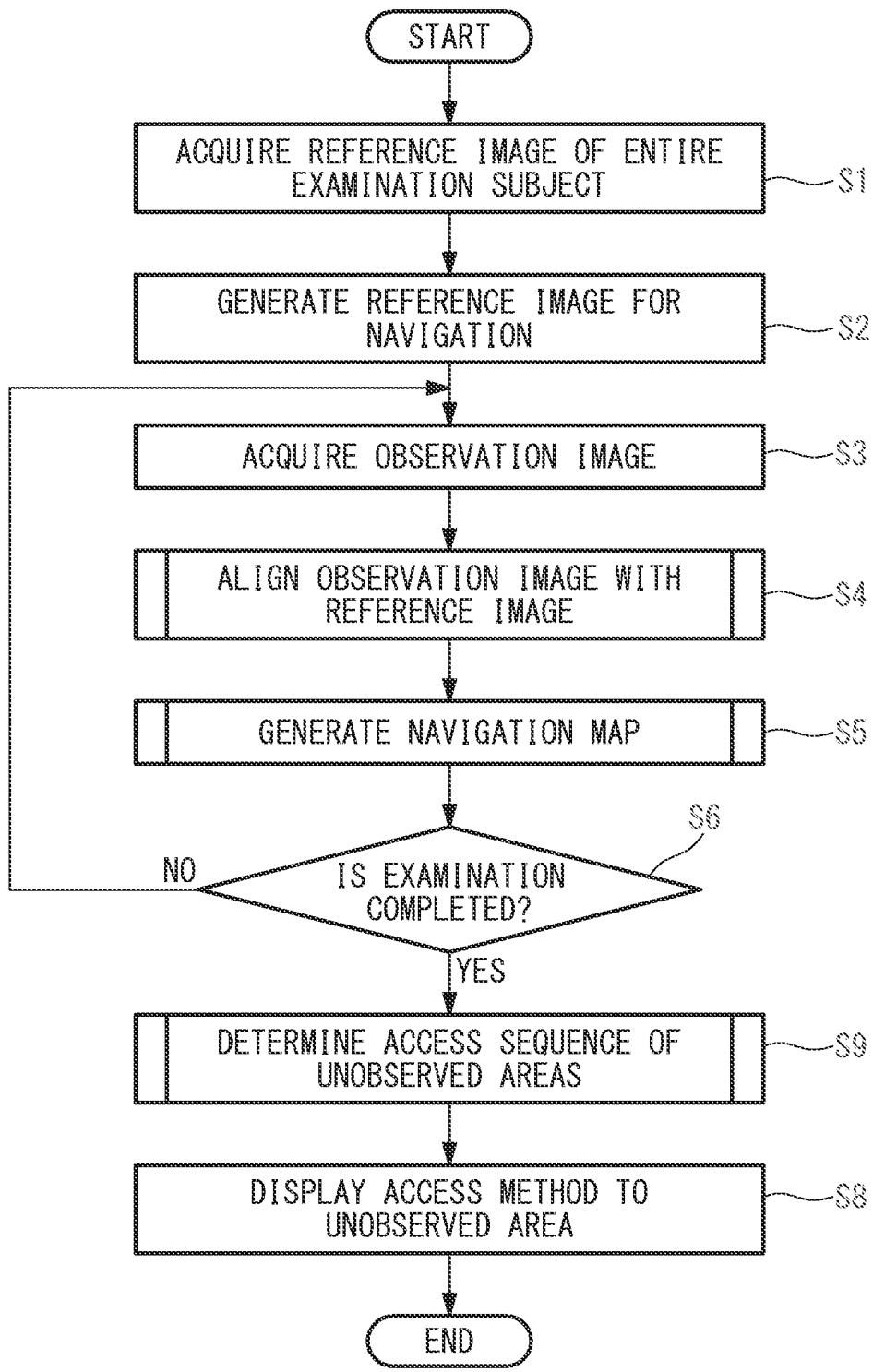
FIG. 7A is a flowchart illustrating the operation of the microscopic examination device illustrated in FIG. 6.

As illustrated in FIG. 7A, after the navigation map generating unit 8 finishes generation of the navigation map B, when there are more than one unobserved areas in the navigation map B, the access sequence determining unit 11 determines the sequence in which the unobserved areas are to be navigated (step S9).

Figure 7B:
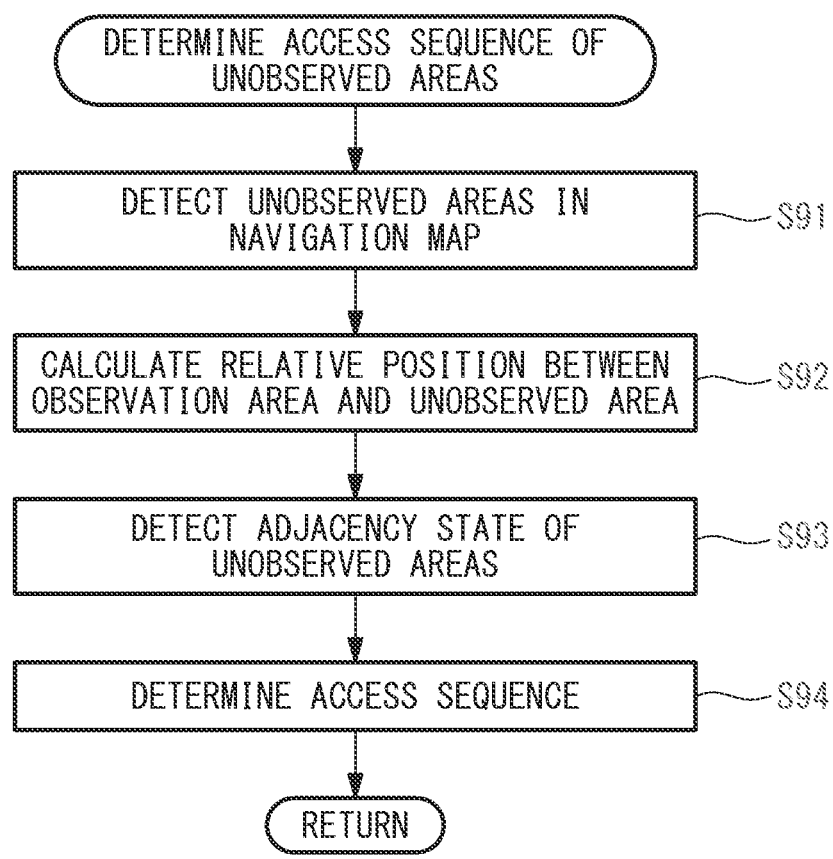
FIG. 7B is a flowchart illustrating a process of determining the access sequence to unobserved areas illustrated in FIG. 7A.

FIG. 7B illustrates one example of the method for determining the access sequence. In the example illustrated in FIG. 7B, the access sequence determining unit 11 detects unobserved areas from the navigation map B (step S91). Next, in order to calculate the relative position between the current observation area D and each of the unobserved areas, the access sequence determining unit 11 calculates the direction and amount of movement from the current observation area D to each of the unobserved areas in the navigation map B (step S92). The method for calculating the direction and amount of movement are the same as the method for calculating the direction and amount of movement employed in the access calculation unit 9. Next, the access sequence determining unit 11 detects the adjacency state of the unobserved areas (step S93), and, on the basis of the distances from the current observation area D to each of the unobserved areas and the adjacency state of the unobserved areas, the access sequence determining unit 11 determines the access sequence of the unobserved areas (step S94).

Figure 8:
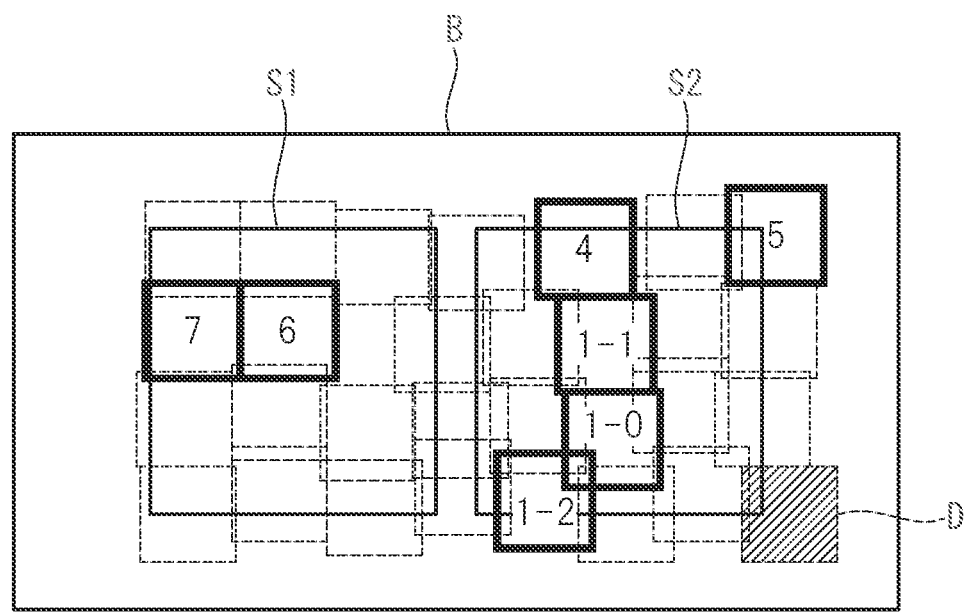
FIG. 8 FIG. 8 is a diagram illustrating one example of a method for determining the access sequence of unobserved areas.

FIG. 8 illustrates a specific example of the method for determining the access sequence.

In this example, N unobserved areas are assigned with distance ranks (from 1 to N) according to the distance from the current observation area D. In FIG. 8, rectangles of solid lines in the navigation map B indicate the unobserved areas. The distance rank of the unobserved area having the shortest distance is 1, and the distance rank of the unobserved area having the longest distance is N.

Next, the adjacency state between the distance rank 1-unobserved area and other unobserved areas is detected, and access ranks are assigned to the rank 1-unobserved area and the unobserved areas adjacent thereto. The adjacent unobserved areas are unobserved areas that are present in 8 neighbours of a particular unobserved area. Specifically, an access rank 1-0 is assigned to the unobserved area having a distance rank of 1, and neighbor ranks serving as access ranks are assigned to the adjacent unobserved areas that are present in 8 neighbors of the rank 1-unobserved area. In the example illustrated in FIG. 8, a rank 1-1 and a rank 1-2 are respectively assigned, as neighbor ranks, to the two adjacent unobserved areas adjacent to the rank-1 unobserved area. The neighbor rank is, for example, successively assigned clockwise. The adjacent unobserved areas assigned with the neighbor ranks are labeled as assigned.

Next, the unobserved areas labeled as assigned are set aside, the adjacency state of the unobserved area having the next-highest distance rank is detected, and access ranks are assigned to the next-highest-rank unobserved area and unobserved areas adjacent thereto. Then the same process is repeated until all unobserved areas are assigned with access ranks. The access ranks constitute the access sequence.

The access sequence determination method described above is merely an example, and the access sequence may be determined by other methods. For example, the access sequence may be determined such that an unobserved area that can be accessed from the current observation area D by linear movement, for example, an unobserved area located above or under or on the right- or left-hand side of the current observation area D, is assigned a higher rank.

The navigation presenting unit 10 displays on the navigation map B an access method for accessing two or more unobserved areas according to the access sequence.

According to this modification, a moving route of the examination subject S for efficiently accessing the unobserved areas in order of proximity from the current observation area D can be presented to the operator, and the efficiency of examination can be improved.

Second Embodiment

Next, a microscopic examination device and a microscopic examination system according to a second embodiment of the present invention are described with reference to the drawings.

The microscopic examination device and the microscopic examination system according to this embodiment have identical device structures to the microscopic examination device 101 and the microscopic examination system 102 illustrated in FIG. 6, but are different from the microscopic examination device 101 and microscopic examination system 102 in the process conducted in the navigation presenting unit 10.

Figure 9:
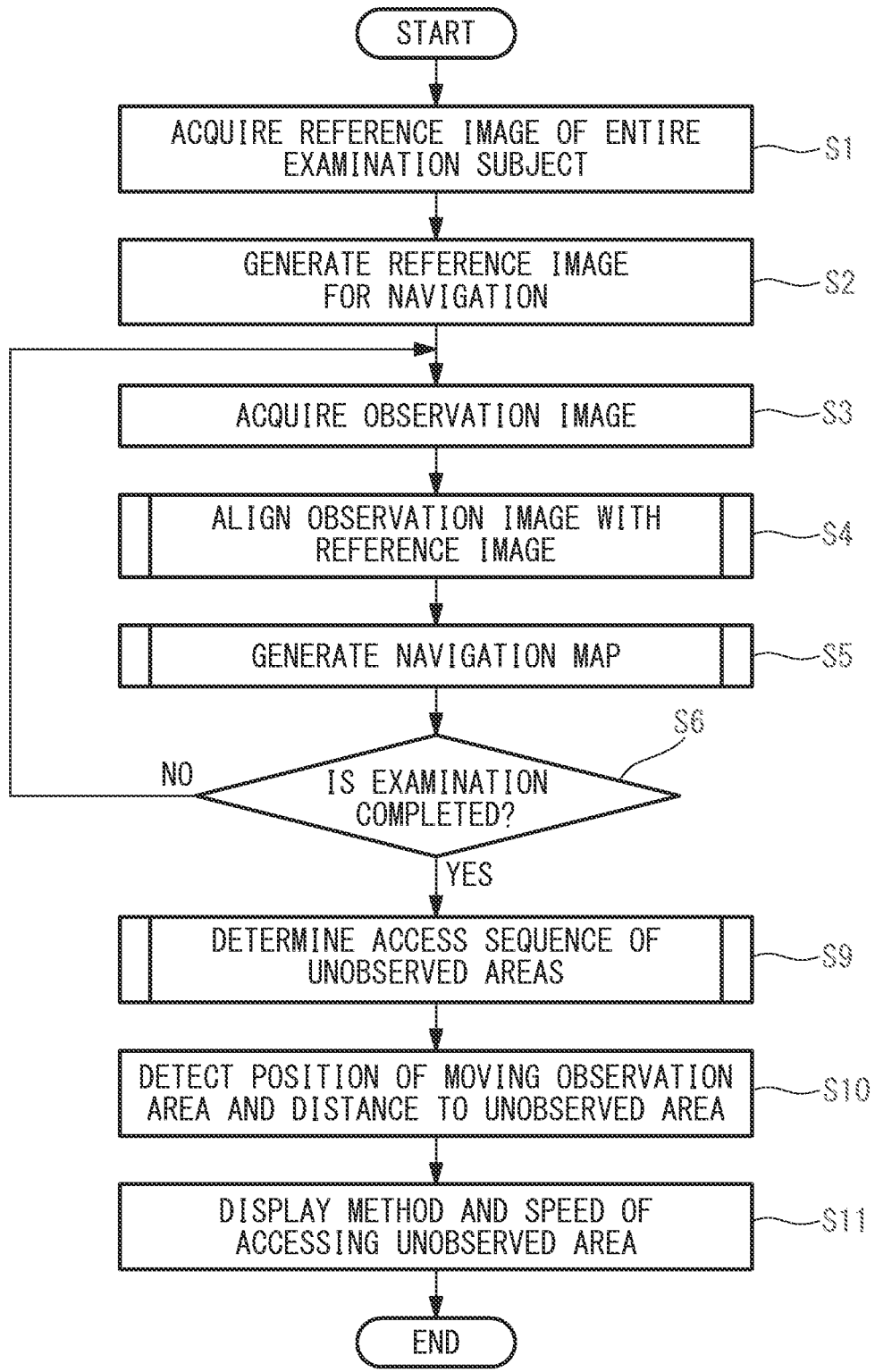
FIG. 9 FIG. 9 is a flowchart illustrating the operation of a microscopic examination device according to a second embodiment of the present invention.

As illustrated in FIG. 9, while the observation area is being moved to an unobserved area E, the navigation presenting unit 10 presents on a navigation map B the access speed that changes according to the distance from the current observation area to the unobserved area E in addition to the access method C from the current observation area to the unobserved area E (step S11).

Thus, as the observation area is being moved, the position of the observation area and the distance from the observation area to the unobserved area E are detected and monitored (step S10).

The position of the moving observation area is detected by the alignment unit (position detecting unit) 7. In other words, as the observation area is being moved, the imaging unit 2 acquires an observation image at a particular timing. The alignment unit 7 aligns the observation image with the reference image, and detects, as the position of the current observation area, the position of the observation image in the reference image.

The distance from the position of the observation area detected by the alignment unit 7 to the unobserved area E is detected by the access calculation unit 9. The access calculation unit 9 calculates the distance from the current observation area to the unobserved area E by the same method as the method for calculating the amount of movement from the current observation area D to the unobserved area E described in the first embodiment.

Figure 10A:
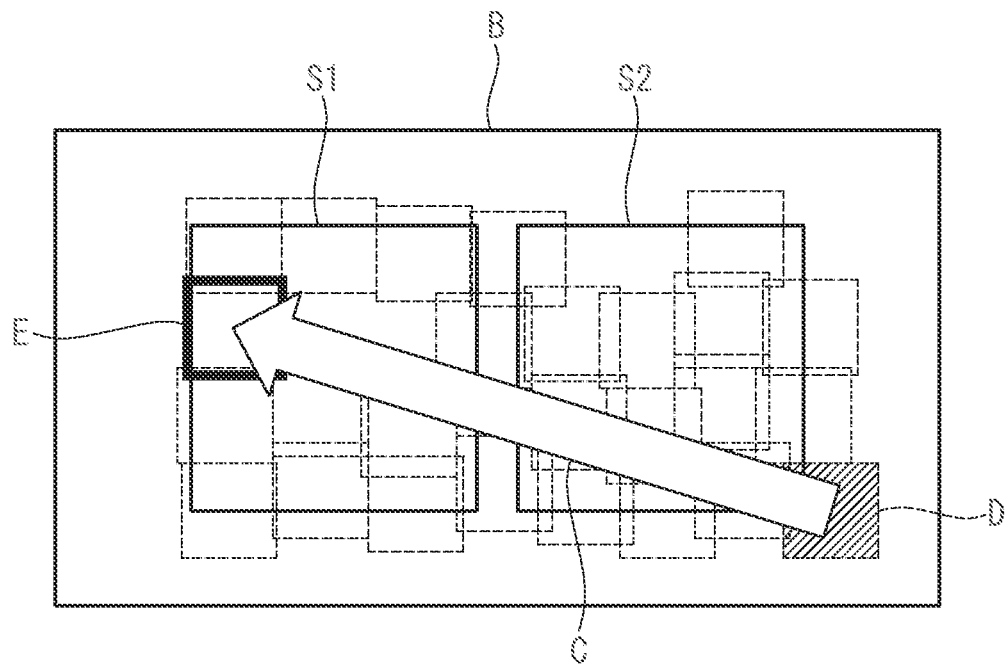
FIG. 10A is a diagram illustrating one example of the indicator of an access speed.
Figure 10B:
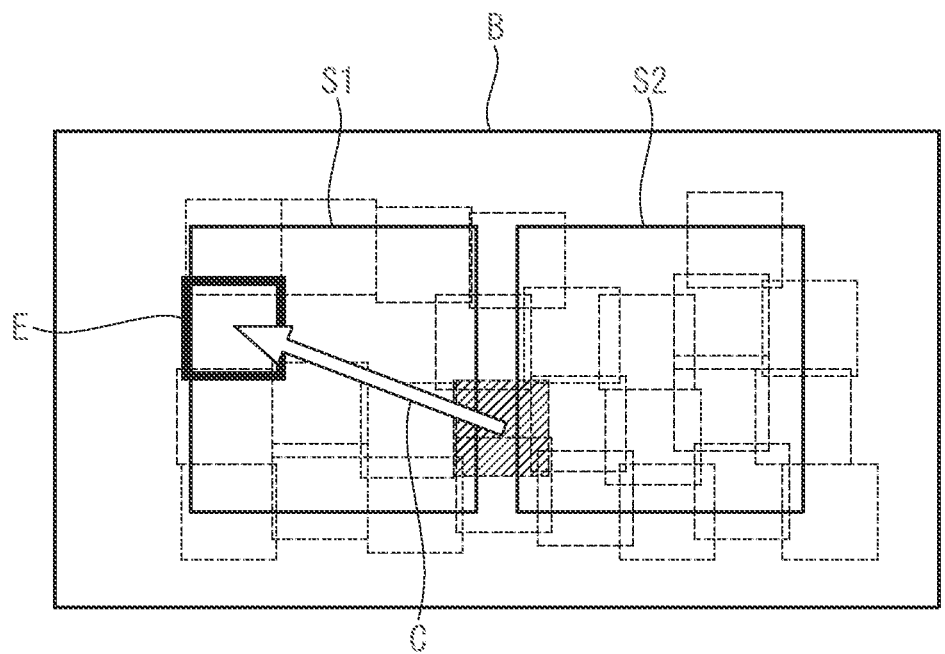
FIG. 10B illustrates one example of the indicator of the access speed.
Figure 11A:
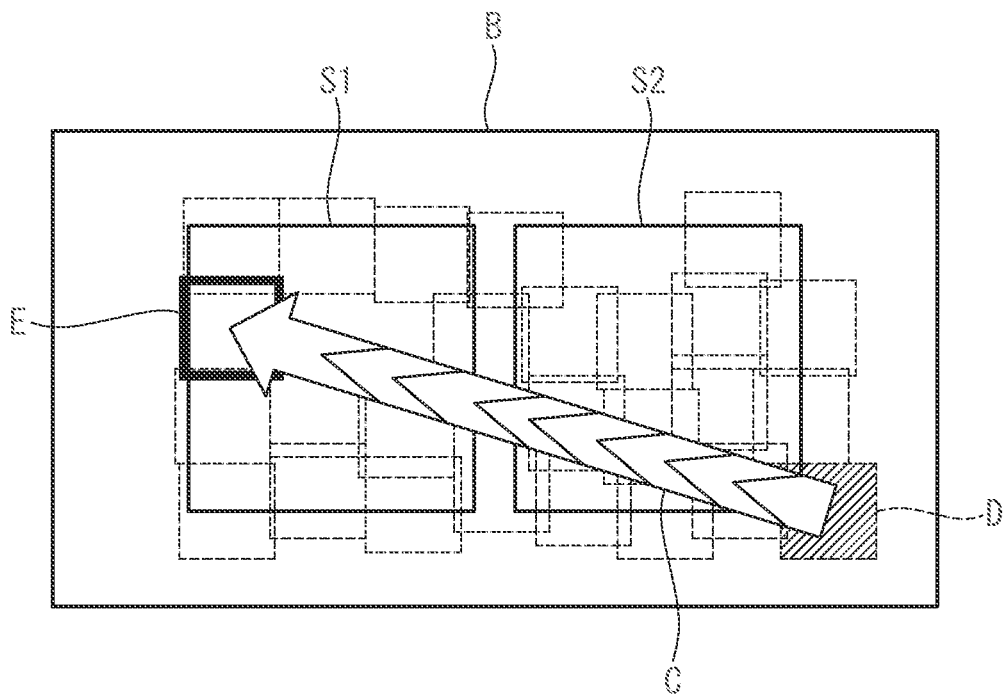
FIG. 11A is a diagram illustrating another example of the indicator of the access speed.
Figure 11B:
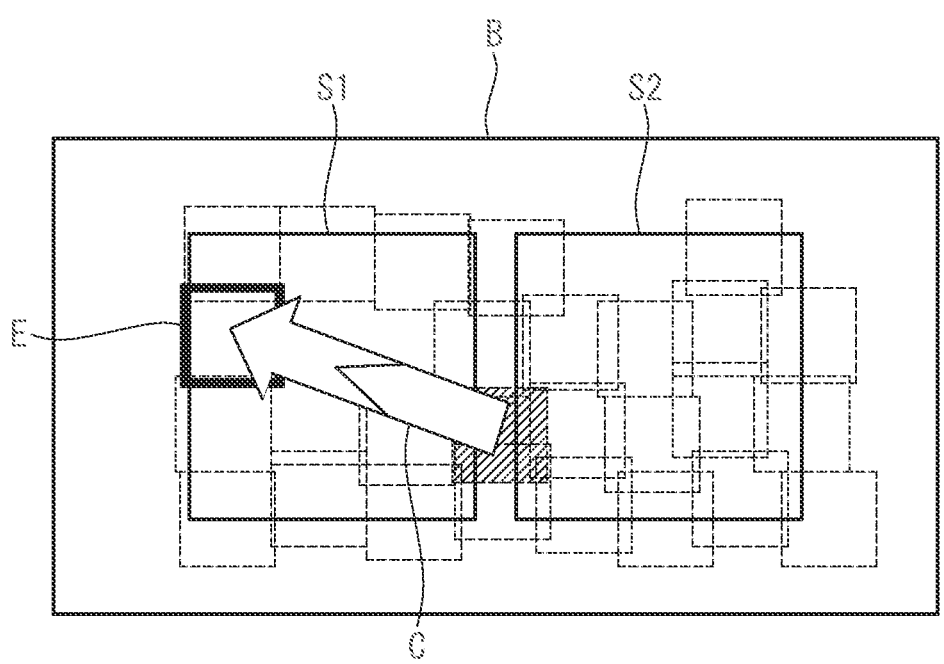
FIG. 11B is a diagram illustrating yet another example of the display of the access speed.

The navigation presenting unit 10 displays, on the navigation map B, a speed indicator suggesting the access speed on the basis of the distance from the observation area to the unobserved area E. When the distance from the observation area to the unobserved area E is short, the speed indicator suggests slowing down the access speed. For example, as illustrated in FIGS. 10A and 10B, the arrow C indicating the direction and amount of movement is a speed indicator, and the thickness of the arrow C indicates the access speed. In such a case, the shorter the distance from the observation area to the unobserved area E, the thinner the arrow C. Alternatively, as illustrated in FIGS. 11A and 11B, the access speed may be indicated by the number of "<" signs in the arrow C indicating the direction and amount of movement. In such a case, the slower the suggested access speed, the fewer the signs.

According to this embodiment, the following effects are exhibited in addition to the effects of the first embodiment. Specifically, since the speed indicator on the navigation map B changes according to the changes in the distance from the observation area to the unobserved area E while accessing the unobserved area E, the operator can easily and intuitively recognize the appropriate access speed from the speed indicator.

The moving speed of the examination subject S can be appropriately adjusted. For example, when the observation area is far from the unobserved area E, the examination subject S is moved quickly relative to the objective lens 22, and when the observation area is near the unobserved area E, the examination subject S is slowly moved relative to the objective lens 22.

The navigation presenting unit 10 may be equipped with a haptic device installed in the handle 23a, and the haptic device may present, to the hand of the operator maneuvering the handle 23a, a haptic sense corresponding to the access speed.

For example, the haptic device may generate a reaction force against the maneuvering of the handle 23a by the operator, and this reaction force may be decreased with the increasing access speed.

Third Embodiment

Next, a microscopic examination device 103 and a microscopic examination system 300 according to a third embodiment of the present invention are described with reference to the drawings.

Figure 12:
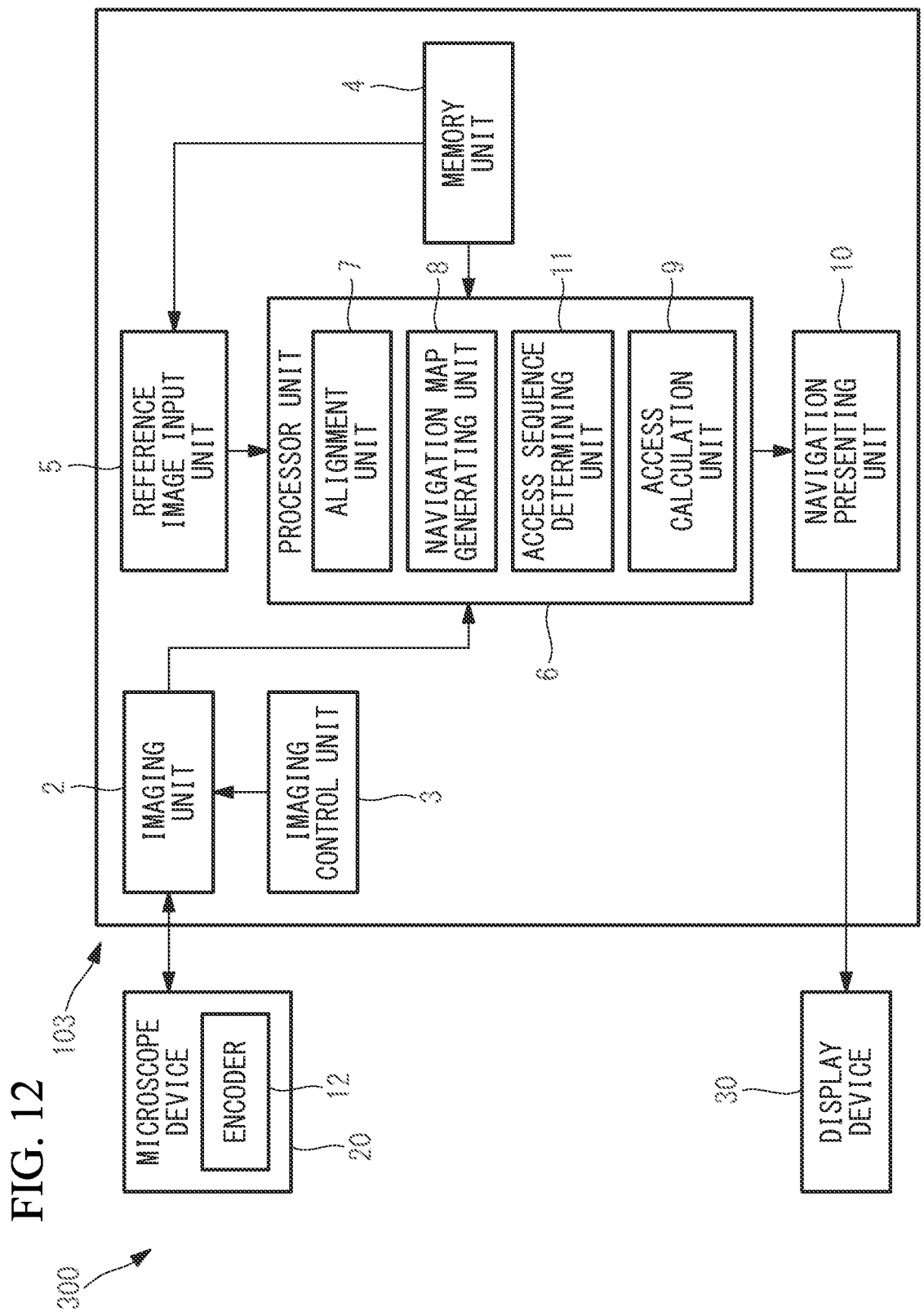
FIG. 12 FIG. 12 is a diagram of the overall structure of a microscopic examination device and a microscopic examination system according to a third embodiment of the present invention.

The microscopic examination device 103 according to this embodiment is applied to a microscope device 20 equipped with a stage 21. As illustrated in FIG. 12, the microscopic examination device 103 further includes an encoder 12 that is installed in the microscope device 20 and detects the position of the stage 21. Other structures of the microscopic examination device 103 and the microscopic examination system 300 are identical to those of the microscopic examination device 101 and the microscopic examination system 102 illustrated in FIG. 6.

The encoder 12 detects the position of the stage 21 during and after the visual examination. The position of the stage 21 detected by the encoder 12 is the relative position relative to the examination starting position.

Figure 13A:
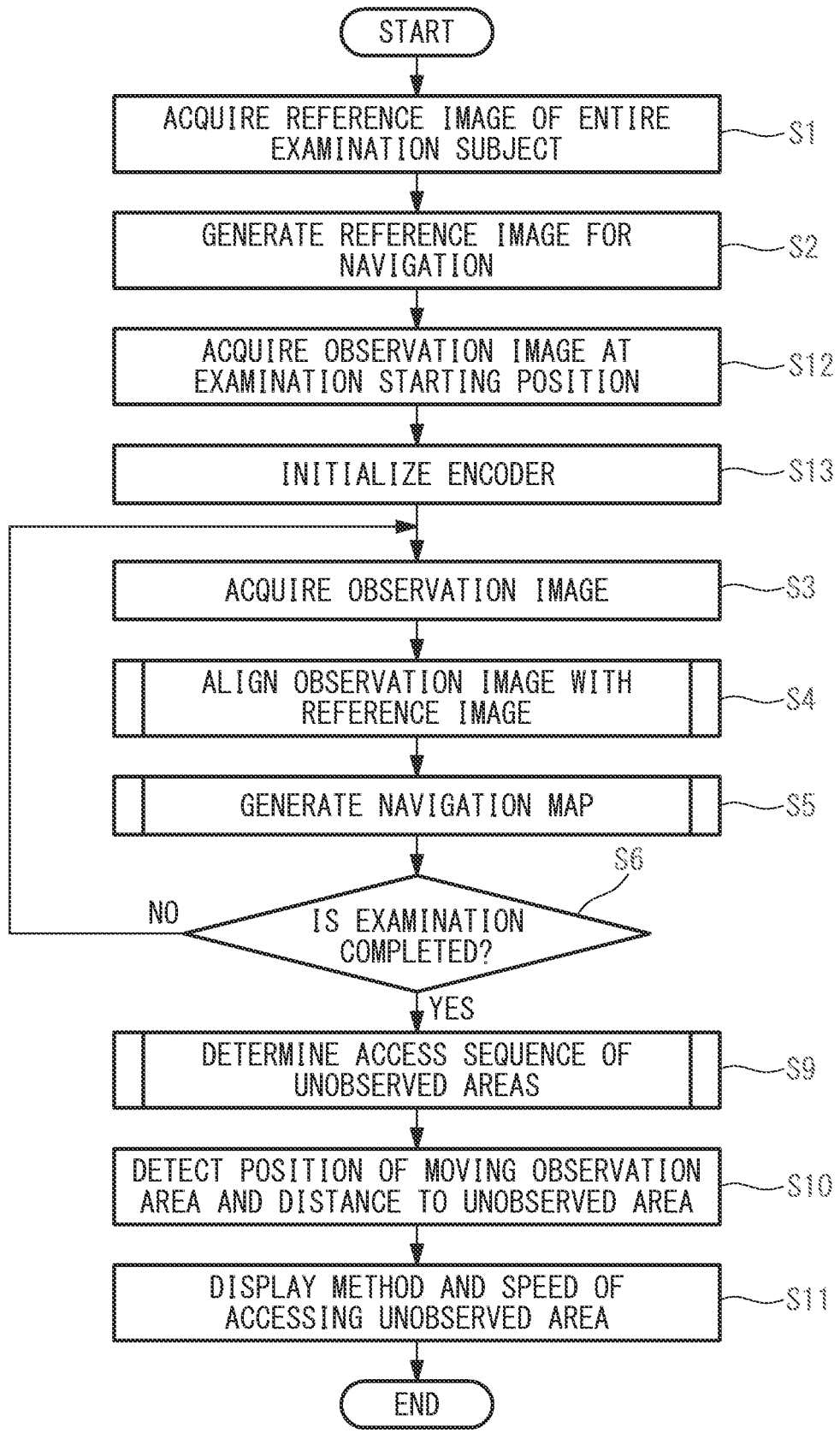
FIG. 13A is a flowchart illustrating the operation of the microscopic examination device illustrated in FIG. 12.

As illustrated in FIG. 13A, before starting the visual examination, the operator moves the observation area to the examination starting position, and commands the imaging unit 2 to acquire an observation image at the examination starting position (step S12). The examination starting position is a predetermined position within the examination subject S.

Since the operator moves the observation area by hand, it is possible that the position of the observation area would deviate from the examination starting position. The examination starting position may be automatically corrected to the position of the observation area set by the operator. For example, the position of the observation area in the reference image may be detected by aligning the observation image at the examination starting position with the reference image, and the examination starting position may be changed to the detected position.

Next, the setting of the encoder 12 is initialized (step S13). Then the visual examination is started, and the imaging unit 2 acquires an observation image on the basis of the movement of the observation area (step S3).

In step S4, the alignment unit 7 aligns the observation image with the reference image on the basis of the position of the stage 21 detected by the encoder 12.

Figure 13B:
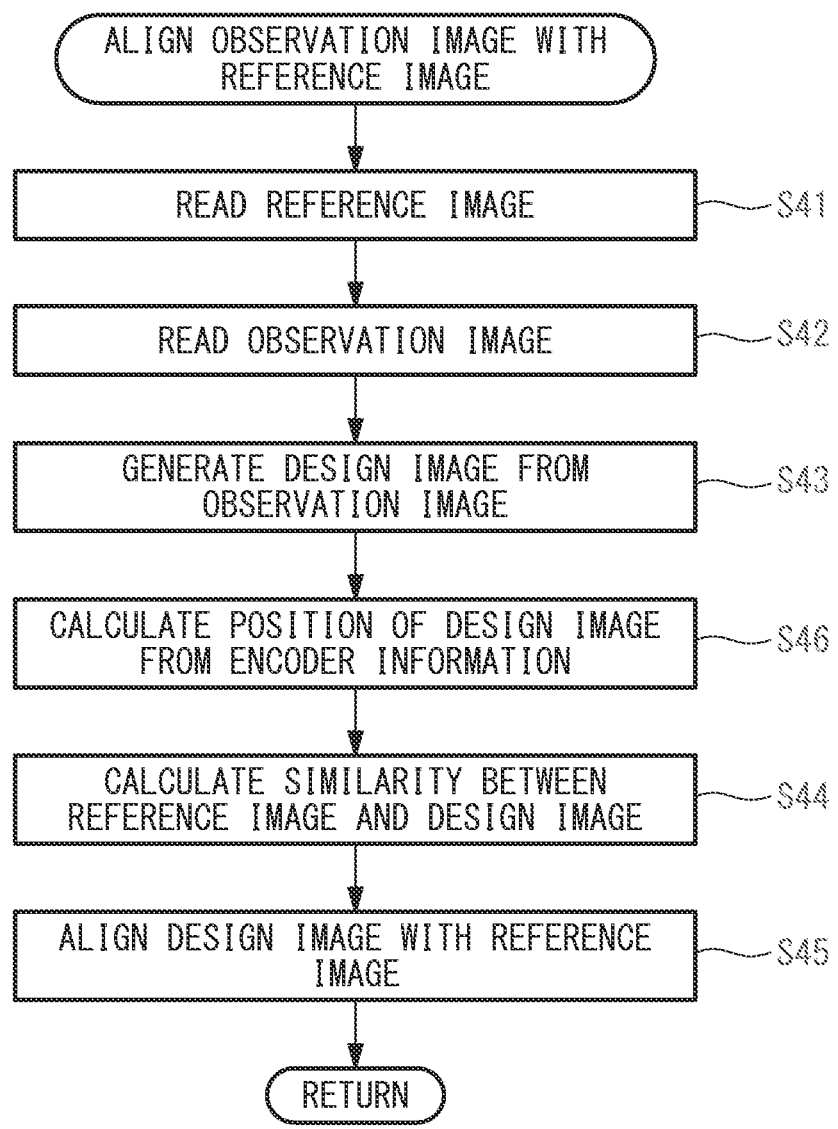
FIG. 13B is a flowchart illustrating a process of aligning an observation image with a reference image illustrated in FIG. 13A.

Specifically, as illustrated in FIG. 13B, the alignment unit 7 calculates the position of the design image in the reference image on the basis of the examination starting position and the position of the stage 21 detected by the encoder 12 (step S46), and aligns the design image with the calculated position (step S45).

There may be cases where the design image is rotated with respect to the reference image. After the design image is temporarily aligned, the alignment unit 7 may rotate the design image with respect to the reference image and calculate the similarity between the reference image and the design image at different rotation angles (step S44), and may finally align the design image with the reference image at a rotation angle at which the highest similarity is detected (step S45).

In step S10 also, the alignment unit 7 detects the position of the moving observation area on the basis of the examination starting position and the position of the stage 21 detected by the encoder 12.

According to this embodiment, by using the position of the stage 21 detected by the encoder 12, the time taken to search for the area that corresponds to the observation image in the reference image can be shortened. Moreover, the accuracy of aligning the observation image with the reference image and the accuracy of detecting the position of the moving observation area are improved, and thus the navigation accuracy to the unobserved area E can be improved. Thus, overlooking of the unobserved area E caused by alignment errors or the like can be avoided.

In the respective embodiments described above, the access calculation unit 9 calculates the direction and amount of movement to the unobserved area E; alternatively, the access calculation unit 9 may calculate only the direction of movement to the unobserved area E. In such a case, the navigation presenting unit 10 presents the access method solely on the basis of the direction of movement. For example, the navigation presenting unit 10 displays, on the navigation map B, an arrow that has a desired length and is directed from the current observation area D to the unobserved area E. The operator can reach the unobserved area E by moving the observation area in the direction indicated by the arrow.

As a result, the above-described embodiments lead to the following aspects.

An aspect of the present invention is directed to a microscopic examination device that includes: an imaging unit that images an observation area of an examination subject observed with a microscope device so as to acquire an image of the observation area; an alignment unit that aligns the image of the observation area with an area within a reference image, the area corresponding to the image of the observation area, the reference image including an entirety of the examination subject; a navigation map generating unit that generates a navigation map from the reference image by recording, on the reference image, a position of the image of the observation area in the reference image; an access calculation unit that calculates a direction of movement to an unobserved area in the navigation map, the unobserved area being an area where the position of the image of the observation area is not recorded; and a navigation presenting unit that presents an access method to the unobserved area on the basis of the direction of movement.

According to this aspect, in parallel with the visual examination of the examination subject by using a microscope device operated by the operator, an image of the observation area of the examination subject is acquired and a navigation map is generated by the microscopic examination device. That is, the imaging unit acquires the image of the observation area, and the alignment unit aligns the image of the observation area with the reference image. Then the navigation map generating unit records, on the reference image, the position of the image of the observation area.

The operator manually moves the examination subject or the stage of the microscope device on which the examination subject is placed to move the observation area, and visually examines all parts of the examination subject. As the observation area is moved, the imaging unit acquires images of observation areas at different positions in the examination subject, and the positions of the observation areas are added to the reference image. As a result, the positions of the areas observed by the operator are sequentially recorded on the reference image, and a navigation map is generated from the reference image. When an unobserved area not yet observed by the operator remains in the examination subject, the navigation map includes the unobserved area where the position of the image of the observation area has not been recorded. Next, the access calculation unit calculates the direction of movement to the unobserved area in the navigation map, and the access method to the unobserved area is presented by the navigation presenting unit.

Using the navigation map, the operator can easily recognize whether an unobserved area is present in the examination subject. When an unobserved area is present, the operator, on the basis of the access method presented by the navigation presenting unit, can easily recognize the method for moving the observation area of the microscope device to the unobserved area. In addition, by using the alignment of the reference image and the image of the observation area, the position of the observation area to be manually moved can be detected.

In the aspect described above, the access calculation unit may further calculate an amount of movement to the unobserved area, and the navigation presenting unit may present the access method on the basis of the direction and amount of movement.

According to such a structure, a more specific access method to the unobserved area can be presented.

In the aspect described above, the microscopic examination device may further include an encoder that is installed in the microscope device and detects a position of a stage of the microscope device, and, on the basis of the position of the stage detected by the encoder, the alignment unit may calculate a position of the area in the reference image, the area corresponding to the image of the observation area.

According to such a structure, the position in the reference image to be aligned with the image of the observation area can be calculated with less computation efforts, and thus the time taken to align the image of the observation area with the reference image can be shortened. Moreover, the alignment accuracy of the image of the observation area with the reference image can be improved.

In the aspect described above, the microscopic examination device may further include an access sequence determining unit that determines an access sequence of two or more unobserved areas, and the navigation presenting unit may present the access method for accessing the two or more unobserved areas according to the access sequence.

According to such a structure, when two or more unobserved areas are present on the navigation map, the order in which the two or more unobserved area are accessed can be presented to the operator.

In the aspect described above, the microscopic examination device may further include a position detecting unit that detects the position of the observation area moving toward the unobserved area, the navigation presenting unit may present an access speed on the basis of the position of the observation area detected by the position detecting unit, and the access speed may change according to a distance from the detected position of the observation area to the unobserved area.

The access speed is the speed of moving the observation area to the unobserved area, that is, the speed of moving the examination subject or the stage. According to such a structure, an appropriate access speed for the distance to the unobserved area can be presented to the operator.

In the aspect described above, the navigation presenting unit may display, on the navigation map, an indicator indicating the access speed. Alternatively, the navigation presenting unit may include a haptic device installed in a handle used to manually maneuver a stage of the microscope device, and the haptic device may present, to the hand of the operator maneuvering the handle, a haptic sense corresponding to the access speed.

According to such a structure, the access speed is visually or haptically presented to the operator. Thus, the operator can more intuitively recognize the access speed.

Another aspect of the present invention is directed to a navigation method for guiding an observation area of an examination subject to be observed with a microscope device, the navigation method including: imaging the observation area to acquire an image of the observation area; aligning the image of the observation area with an area in a reference image, the area corresponding to the image of the observation area, the reference image including an entirety of the examination subject; generating a navigation map from the reference image by recording, on the reference image, a position of the image of the observation area in the reference image; calculating a direction of movement to an unobserved area in the navigation map, the unobserved area being an area where the position of the image of the observation area is not recorded; and presenting an access method to the unobserved area on the basis of the direction of movement.

The present invention affords the advantage that, in manually operated microscopic examination, the operator can more easily recognize a method for accessing an unobserved area of the examination subject.

REFERENCE SIGNS LIST 1, 101, 103 microscopic examination device
2 imaging unit
3 imaging control unit
4 memory unit
5 reference image input unit
6 processor unit
7 alignment unit, position detecting unit
8 navigation map generating unit
9 access calculation unit
10 navigation presenting unit
11 access sequence determining unit
12 encoder
20 microscope device
21 stage
30 display device
100, 102, 300 microscopic examination system
B navigation map
S examination subject

The invention claimed is:
1. A microscopic examination device comprising:
a camera that images an observation area of an examination subject observed with a microscope device so as to acquire an image of the observation area; and
one or more processors comprising hardware, the one or more processors being configured to:
align the image of the observation area with an area in a reference image, the area corresponding to the image of the observation area, the reference image including an entirety of the examination subject;
generate a navigation map from the reference image by recording, on the reference image, a position of the image of the observation area in the reference image;

calculate a direction of movement to an unobserved area in the navigation map, the unobserved area being an area where the position of the image of the observation area is not recorded; and present an access method to the unobserved area on a basis of the direction of movement.

2. The microscopic examination device according to claim 1, wherein:

the calculating of the direction of movement further calculates an amount of movement to the unobserved area, and the presenting of the access method presents the access method on a basis of the direction and amount of movement.

3. The microscopic examination device according to claim 1, further comprising:

an encoder that is installed in the microscope device and detects a position of a stage of the microscope device, wherein, on a basis of the position of the stage detected by the encoder, the aligning of the image calculates a position of the area in the reference image, the area corresponding to the image of the observation area.

4. The microscopic examination device according to claim 1, wherein the one or more processors are further configured to determine an access sequence of two or more unobserved areas, and wherein the presenting of the access method presents the access method for accessing the two or more unobserved areas according to the access sequence.

5. The microscopic examination device according to claim 1, wherein the one or more processors are further configured to detect the position of the observation area moving toward the unobserved area, and wherein the presenting of the access method presents an access speed on a basis of the position of the detected observation area, and the access speed changes according to a distance from the detected position of the observation area to the unobserved area.

6. The microscopic examination device according to claim 5, wherein the presenting of the access method displays, on the navigation map, an indicator indicating the access speed.

7. The microscopic examination device according to claim 5, further comprising a haptic device installed in a handle used to manually maneuver a stage of the microscope device, and the presenting of the access method presents, to a hand of an operator maneuvering the handle, a haptic sense corresponding to the access speed via the haptic device.

8. A navigation method for guiding an observation area of an examination subject to be observed with a microscope device, the navigation method comprising:

imaging the observation area to acquire an image of the observation area;

aligning the image of the observation area with an area in a reference image, the area corresponding to the image of the observation area, the reference image including an entirety of the examination subject;

generating a navigation map from the reference image by recording, on the reference image, a position of the image of the observation area in the reference image;

calculating a direction of movement to an unobserved area in the navigation map, the unobserved area being an area where the position of the image of the observation area is not recorded; and presenting an access method to the unobserved area on a basis of the direction of movement.

* * * * *